June 4, 1935.  R. R. SMITH  2,003,521
COMBINED ORANGE REAMER AND BEATER
Filed June 7, 1933  2 Sheets-Sheet 1
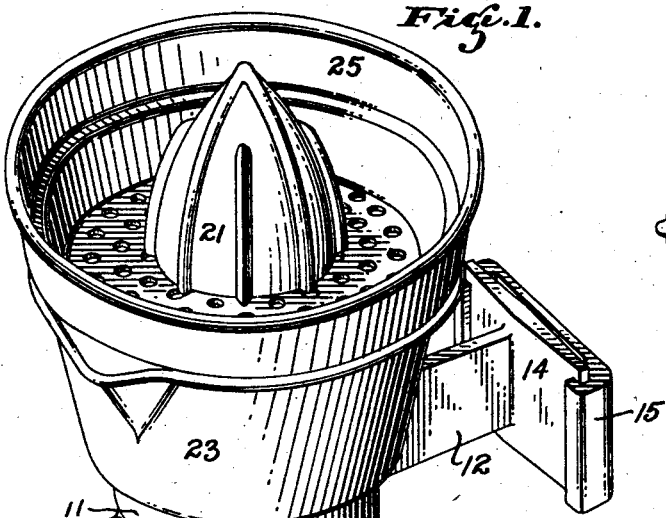
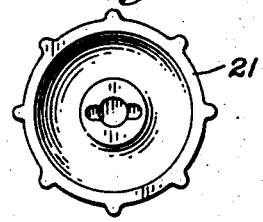
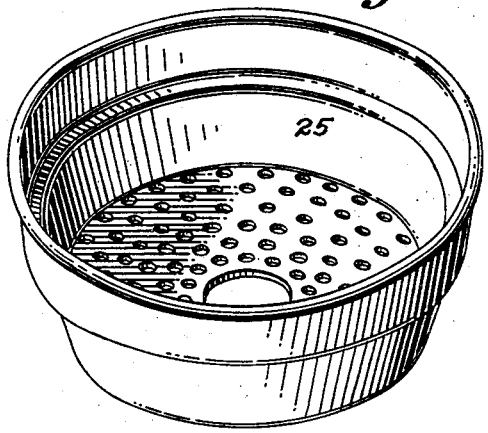
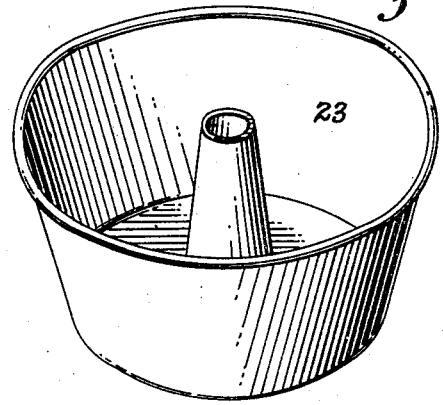
INVENTOR.
Ralston R. Smith
BY Townsend & Loftus
ATTORNEYS.

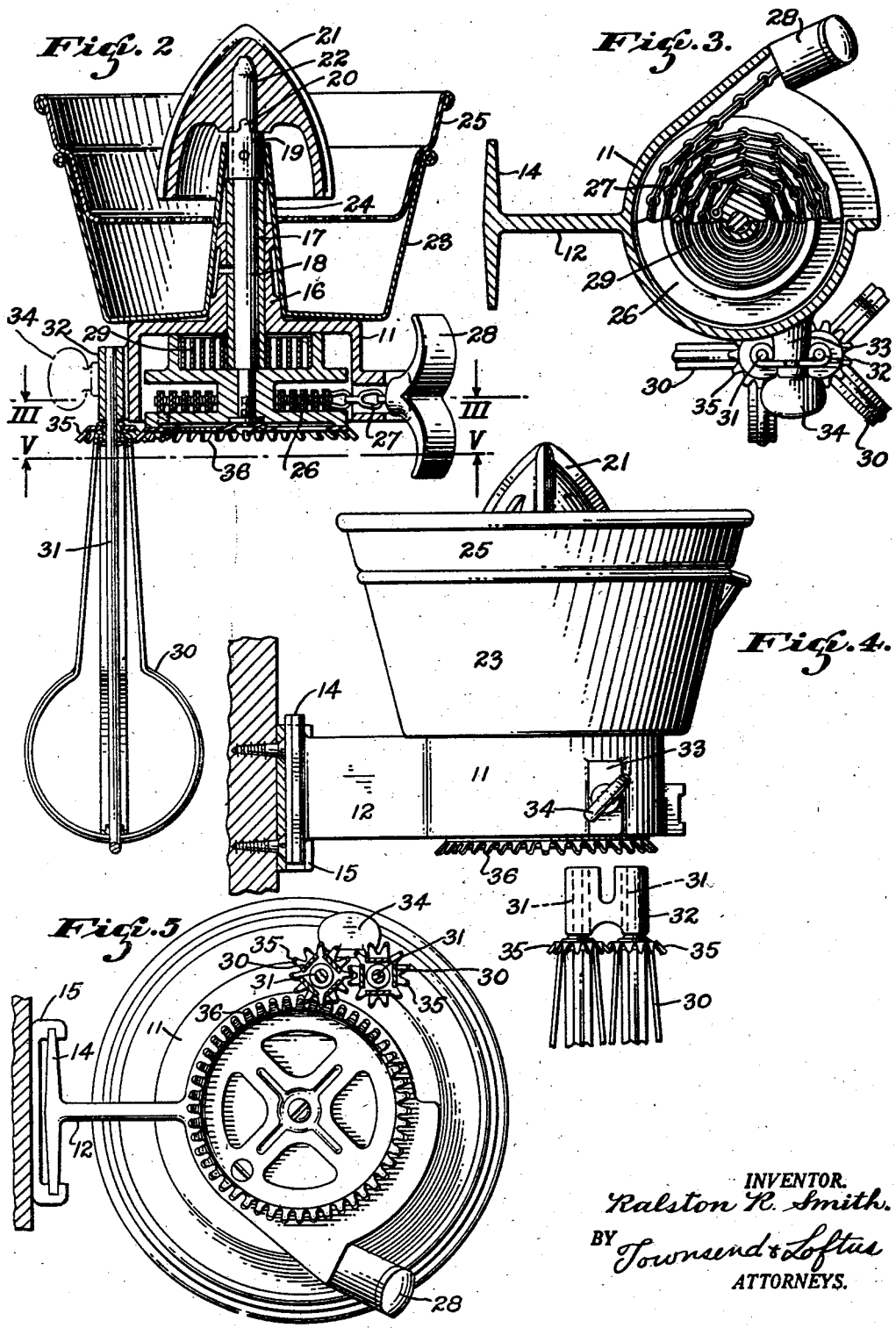

Patented June 4, 1935

2,003,521

UNITED STATES PATENT OFFICE 2,003,521

COMBINED ORANGE REAMER AND BEATER

Ralston R. Smith, Oakland, Calif.

Application June 7, 1933, Serial No. 674,643

1 Claim. (Cl. 259—131)

This invention relates to an improved culinary apparatus.

It is the principal object of the present invention to provide a generally improved and simplified culinary device which is capable of use in extracting the juice from citrus fruits and also capable of use as a beater, the device being inexpensive to produce and easily manipulated either as a citrus fruit extractor or as a beater.

One form which the invention may assume is exemplified in the following description and illustrated by way of example in the accompanying drawings, in which:

Fig. 1 is a perspective view of a combined citrus fruit juice extractor and beater embodying the preferred form of my invention.

Fig. 2 is a central vertical section through the same.

Fig. 3 is a plan sectional view taken on line III—III of Fig. 2.

Fig. 4 is a side elevation of the device.

Fig. 5 is a transverse sectional view taken on line V—V of Fig. 2.

Fig. 6 is a bottom view of the reamer element.

Fig. 7 is a perspective view of the strainer.

Fig. 8 is a perspective view of the juice trapping cup.

Referring more particularly to the accompanying drawings, I have illustrated a combined citrus fruit extracting device and a beater mechanism. This apparatus includes a hollow cylindrical housing 11 having a radially extending arm 12 formed as a rigid part thereof. At the outer end of this arm 12 it is formed with a transverse latch plate 14 adapted to engage a socket 15 which may be securely fastened on any upright support. The latch plate 14 is removably engaged with the socket 15 in order that the entire device may be detachably mounted in position for use.

When the device is mounted for use, the axis of the cylindrical housing 11 is vertically disposed as illustrated in the drawings. Formed as an integral part of the housing and extending vertically therefrom in concentric relation thereto is a tapered trunnion 16. Secured within this trunnion is a bushing or sleeve 17 the upper end of which projects beyond the upper end of the trunnion and the lower end of which projects within the cylindrical housing 11. This sleeve is rigidly secured to the trunnion in any preferred manner.

Rotatably mounted within the bushing or sleeve 17 is a vertical reamer shaft 18. The upper end of this shaft projects beyond the upper end of the bushing 17 and is fitted with a fixed thrust collar 19, the lower end of which engages the upper end of the bushing to prevent downward axial movement of the shaft 18 with respect to the bushing 17. The upper end of the collar 19 is formed with two upwardly projecting keys 20. Detachably mounted on the upper end of the shaft is a citrus fruit reamer 21 which is conoidal in shape and which is provided with a central interiorly arranged socket 22 within which the upper end of the shaft 18 nests. At the lower end of this socket the reamer 21 is formed with two diametrically opposed keyways which engage the diametrically arranged keys 20 of the collar so that rotation of the shaft 18 will be accompanied by rotation of the reamer 21. It is apparent from this that the reamer is detachably mounted on the upper end of the shaft so that it may be readily removed for cleansing and replaced on the shaft for operation.

To trap the juice extracted, a juice retaining cup 23 is provided which is slightly frusto-conical. Arranged concentrically of this cup 23 and extending upwardly from the bottom thereof is a sleeve 24 which is adapted to nest over the trunnion 16. The height of this sleeve is substantially the same as the depth of the cup 23. It will be noticed that both ends of the sleeve are open in order that the cup 23 may be mounted on the cylindrical housing 11 with the sleeve nested over the trunnion 16. The height of the sleeve is such that it encloses the junction between the upper end of the bushing 17 and the lower end of the collar 19 to prevent the fruit juices accumulated in the cup 23 from being contaminated by any lubricant present between the engaging surfaces of the shaft 18 and the bushing 17.

Nested within the top of the cup 23 and removably supported thereby is a strainer 25, the perforated or strainer bottom of which being arranged at a spaced distance above the bottom of the cup 23 when the device is assembled for use.

For operating the reamer, a sheave 26 is mounted concentrically within the cylindrical housing 11 and secured on the lower end of the shaft 18 for rotation simultaneously therewith. A pull chain 27 is secured at its innermost end to the sheave and wound thereabout as illustrated with its free end projecting outwardly through an arcuate slot formed in the outer wall of the housing 11. At its outer end the chain 27 is fitted with a grip member 28 which may be grasped to impart a pull to the chain.

Wound about the lower end of the bushing 17 is a spiral spring 29, the inner end of which is anchored in a slot cut in the lower end of the bushing 17. The outer end of the spring, after the same has been placed under sufficient tension, is anchored to the sheave 26 so that the tension of the spring will constantly urge the sheave in one rotative direction, this direction being the opposite of that which the sheave will be caused to rotate by an outward pull on the chain 27. Therefore, the spring will constantly tend to maintain the chain 27 wound on the sheave.

It is, therefore, obvious that when an outward pull is exerted on the grip member 28 to transmit a pull to the chain 27 sufficient to overcome the tension of the spring 29, the sheave 26 will be rotated in one direction, which rotation will be transmitted to the shaft 18 and consequently to the reamer 21. When the pull on the chain is released, the spring 29 will revolve the sheave 26 in the opposite direction, rewinding the chain and consequently revolving the shaft 18 and the reamer 21 in the opposite direction. Thus, by alternately exerting a pull on the chain 27 and letting the spring exert its rotative force upon the sheave, the reamer together with its shaft 18 will alternately rotate in opposite directions. This produces a very ideal reaming action and enables the extraction of juices from citrus fruits to be rapidly and efficiently accomplished.

For the purpose of adding utility to the device, I have provided a beater attachment therefor, which beater attachment includes a pair of agitator or beater members 30 of conventional design. The shafts 31 of these beater members are arranged in parallelism at a spaced distance apart and mounted at one end in a bracket 32 which may be detachably secured at one side of the housing 11. At the point of attachment the housing is provided with an outwardly projecting boss or lug 33 with which the bracket 32 is adapted to engage. A thumb nut 34 is provided for detachably clamping the bracket 32 to the boss 33. The beater members are provided with intermeshing gears 35, one of which is in mesh with a gear 36 secured to the shaft 18 and the sheave 26. It will be seen that the bottom of the housing 11 is open but that the lower end of the sheave 26 in effect forms a closure therefor. The gear 36 is secured to the underside of this sheave and to the shaft 18 so that it will be rotated simultaneously therewith.

In operation of the device, it is constructed substantially as illustrated and described. When it is desired to use the device for extracting the juice from citrus fruits, the beater mechanism is detached from the housing 11 by loosening the thumb screw 34 and disengaging the bracket 32 from the boss 33. The cup 23 and the strainer 25 are then positioned in place on the housing and the reamer 21 mounted on the upper end of the reamer shaft 18. The grip member 28 is then grasped by two fingers of the hand and an outward pull exerted on the chain, causing the sheave, the shaft 18 and the reamer 21 to revolve in one direction. The spring is then permitted to rewind the chain on the sheave, revolving the sheave, the shaft 18 and the reamer 21 in the opposite direction. These operations are repeated until the juice has been fully extracted and entrapped in the cup 23. The juice, of course, will be strained by passing through the perforated or strainer bottom of the strainer member 25.

To remove the cup 23 with the entrapped juice, the reamer 21 is merely lifted off the upper end of the shaft 18 and thereafter the cup 23 and its strainer 25 may be detached from the housing by merely elevating it until the sleeve 24 disengages from the trunnion 16 and the shaft 18.

If it is desired to use the beater device, the bracket 32 is engaged with the boss or lug 33 and clamped in position by the thumb screw 34. Operation of the sheave 26 is then accomplished through the medium of the chain 27 and the spring 29, as previously described, and the rotation of the sheave alternately in opposite directions will be transmitted to the beater members through the medium of the gears 35 and 36.

When it is not desired to use the device, it may be entirely removed from the wall or upright support on which it is mounted by merely upraising the entire housing 11 and detaching the latch plate 14 from the keeper or socket member 15 which is stationarily fixed to the upright support or wall upon which it is found convenient to mount the entire device.

From the foregoing it is obvious that I have provided a very simple and inexpensive combined citrus fruit juice extractor and beater, which device can be produced in quantities very economically and which will operate efficiently to produce its desired functions.

While I have shown the preferred form of my invention, it is to be understood that various changes may be made in its construction by those skilled in the art without departing from the spirit of the invention, as defined in the appended claim.

Having thus described my invention, what I claim and desire to secure by Letters Patent is:

A device of the character described comprising a vertically arranged cylindrical housing open at its lower end, a vertically disposed shaft disposed concentrically of the housing and rotatable therein, a sheave secured to the shaft within the housing, a pull member wound on the sheave and extending through the side of the housing to rotate the shaft in one direction, spring means associated with the sheave and housing to rotate the shaft in the opposite direction upon release of the pull member, a fruit reamer secured to the upper end of the shaft above the housing, a socket for the reception of a geared beater device on the side of the housing, and a gear secured to the bottom of said sheave and positioned to mesh with a gear on the beater device to operate the same upon rotation of the said shaft.

RALSTON R. SMITH.